April 13, 1954    L. R. YEAGER    2,675,420
INSULATED ELECTRICAL CONDUCTOR
Filed March 28, 1950
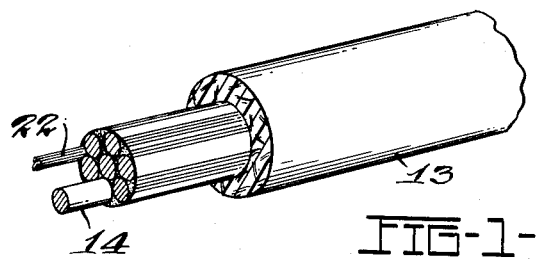
FIG-1-
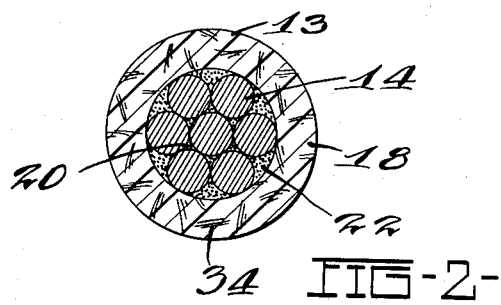
FIG-2-
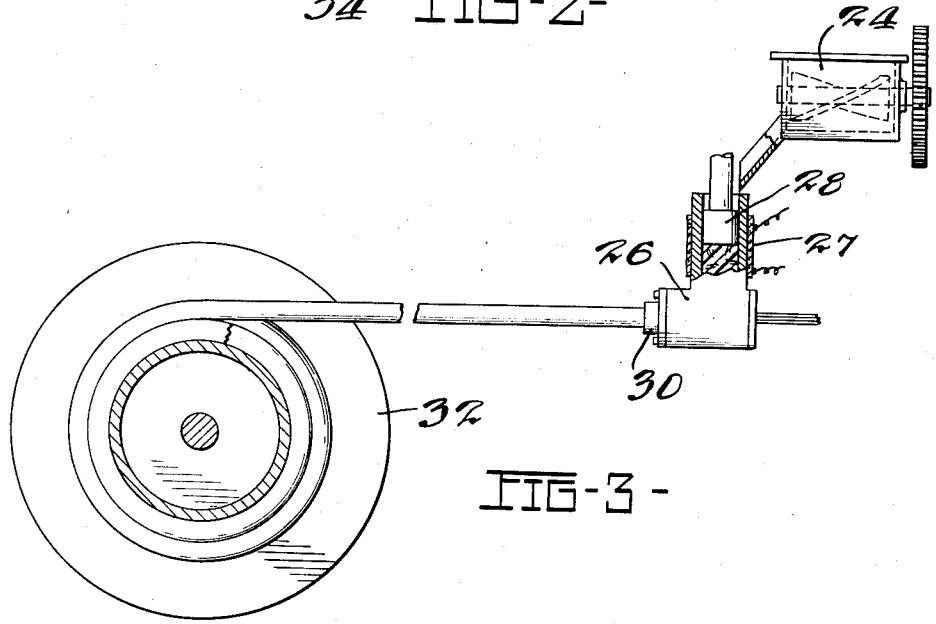
FIG-3-
INVENTOR:
LEO R. YEAGER.
BY
ATTYS.

Patented Apr. 13, 1954

2,675,420

UNITED STATES PATENT OFFICE 2,675,420

INSULATED ELECTRICAL CONDUCTOR

Leo R. Yeager, Upper Arlington, Ohio, assignor to Owens-Corning Fiberglas Corporation, a corporation of Delaware Application March 28, 1950, Serial No. 152,439

6 Claims. (Cl. 174—116)

This invention relates to insulated electrical conductors.

Many types of electrical conductors, for instance, weather-proof wires, have conventionally been covered by braiding cotton yarns over the wire and then impregnating the braided covering with a bituminous or resinous material. Similar constructions are used in other kinds of insulated conductors, such as the cable used for house wiring, where two or more conductors having coverings of rubber or the like are arranged side by side and bound together by and enclosed in a sheath of strands or yarns braided about the two conductors, which sheath is impregnated with asphalt or the like.

These and other kinds of electrical conductors made with layers of impregnated fibrous material braided or wrapped around single or multiple conductors, require a series of operations to apply the covering. The fibrous material must be braided onto the conductor and oftentimes this requires more than one operation and then the covered conductors must be dipped or otherwise have applied thereto the impregnating substance.

To overcome some of the objections to such forms of coverings, and to utilize the advantages of many of the plastic materials as cable coverings, many cables now are covered or jacketed by extruding over them a plastic material, such as neoprene, Koroseal (polyvinyl chloride resin), polyethylene or other adaptable material. Certain disadvantages are inherent in this method, however, due to the more or less common characteristics of all such materials as liability to cold flow, inflammability, lack of toughness and tensile strength, flow under heat, etc.

It is the object of the present invention to provide a means of so improving the texture of the extruded coverings on wires and cables of this type with reference to the liabilities above set forth as to greatly increase the value of this method of wire covering with no present increase and with a possible decrease in cost.

It is a further object of the invention to provide an insulated conductor having a tough wear and abrasion resistant covering and one that will not crack with flexing and bending of the wire, and that is highly resistant to weathering.

Referring to the drawing:

Figure 1 is a perspective view of a multi-conductor cable partly broken away and partly in section;

Figure 2 is a cross-sectional view of the same; and

Figure 3 is a schematic view showing a process for insulating conductors according to the present invention.

The present invention is described in connection with a multi-strand conductor but it is applicable to single strand conductors or any electrical wire or cable in which a metallic conductor is surrounded or sheathed in a covering.

The cable 13 shown in the drawings is made up of a series of wires 14 which may be stranded or solid as desired and which are grouped into the conductor in conventional manner. The group of wires forming the conductor is enclosed in a sheath 18 of resinous material which is preferably extruded around the group of wires. The valleys between the wires at the periphery of the group of wires and also, if desired, the spaces 20 between the wires at the interior of the group of wires may be filled with a fibrous material to round out the surface of the conductor.

This fibrous material and especially that in the valleys is in the form of glass fiber yarns 22 which are arranged lengthwise of the conductor parallel with the wires 14 and are substantially continuous in length throughout any given length of the conductor. These yarns are effective as reinforcing means to increase the tensile strength of the conductor.

By arranging these yarns in the valleys where they will be in contact with the inner surface of the covering 18, the material of the covering engages the yarn as the covering is extruded over the conductor and may even partially impregnate the yarn or group of yarns so as to adhere to the yarns and increase the integrity of the construction. The degree of adherence between the material of the covering 18 and the yarns may be substantially increased, if desired, by coating the yarns before they are incorporated with the wires 14 with the same material as that which makes up the covering 18 or with a material that is compatible with the material of the covering. Alternatively the fibers of the yarn may be coated in conventional manner during their manufacture with such a material to provide a coating of the material on the individual fibers in the yarn.

The covering 18 is formed of polyethylene or polythene, a material that has exceptionally favorable electrical properties and that is highly resistant to weathering. While polyethylene is preferred, other resinous materials may be used, such as polyvinyl acetate, polyvinyl chloride or copolymers of these two resinous materials, polystyrene, and the like, or asphalt, rubber, either natural or synthetic, or of any other material conventionally employed as covering for electrical conductors.

The polyethylene covering has dispersed therethrough a multiplicity of short strands of glass fibers with each strand being composed of a plurality of fibers held together in bundles to form the strand. The fiber bundles or strands may be from one thirty-second to one inch and preferably from about one-eighth to one-quarter inch in length, but may be shorter or longer if desired. Ordinarily no advantages are gained by making the strands longer but instead difficulties are sometimes experienced in dispersing longer strands in the resinous material.

The reinforcing strands may be made by chopping or cutting glass strands or yarns of the kind commercially available and which usually contain 100 or more glass fibers per strand into the desired short lengths in any conventional manner. For instance, the yarns may be taken from spools or bobbins and fed through a cutting device formed by rotary knives coacting with a stationary knife and which may be similar in construction to the cutting reel and bed knife in lawn mowers and similar machines. Alternatively, the bundles of yarns may be fed between coacting reciprocating knives to be chopped to desired length.

The short strands are intermixed with polyethylene by a simple stirring operation or in a conventional mixer, indicated at 24 in Figure 3. Ordinarily it has been found that the admixture of as little as 10 to 20% of fibrous material by weight of the polyethylene is sufficient although other proportions may be employed if desired.

The mixture of polyethylene with the short strands is then fed into a conventional wire covering extruding machine such as that represented at 26 in Figure 3. In the extruding machine the polyethylene is heated by a heating coil 27 to render it sufficiently plastic to be extruded under the pressure exerted on the material by a plunger 28. The plunger forces the plastic material through the nozzle 30 of the extruding machine so that it is formed into a tube surrounding the wires 14 of the cable which are fed centrally through the nozzle. As the cable is covered with the extruded material it is wound onto a reel 32.

The finished coating is shown in Figure 2. Here the covering 18 for the conductor is shown as composed of polyethylene with short strands 34 of glass fibers dispersed through the covering to reinforce it. The strands are haphazardly related to each other but the fibers in each strand are in side by side relation in textile strand form, and may be intertwisted where cut from yarns or untwisted where cut from untwisted strands. Not only does this fibrous reinforcement strengthen and toughen the covering but it substantially reduces the cold flow, eliminates the tendency of the material to flow under the elevated temperatures normally encountered in use, and greatly reduces the inflammability of any of the inflammable materials used.

It is to be noted that the cable construction outlined herein is of special importance in the manufacture of aluminum wire and cable where extruded coverings are used because of the relatively low tensile strength of the aluminum cables as compared to copper cables of equal function and the consequent need of all media for increasing tensile strength in the construction of the finished cable.

I claim:

1. An article of manufacture comprising an electrical conductor and a covering therefor composed of a continuous body of polyethylene completely surrounding the conductor, and fibrous reinforcement for the body of polyethylene composed of short strands of glass fibers distributed through the body and each composed of a multiplicity of glass fibers in compact side by side relation in textile strand form, the strands being haphazardly related to each other.

2. An insulated electrical conductor and a covering therefore, the covering being composed of a continuous body of organic insulating material surrounding the conductor, and fibrous reinforcement for the body of insulating material composed of strands of fibers distributed through the body and being less than about one inch long and each composed of a multiplicity of fibers grouped in compact side by side relation in textile strand form, the strands being haphazardly interrelated.

3. An insulated electrical conductor and a covering thereon, the covering being composed of a continuous body of resinous material extruded over the conductor and completely surrounding the conductor, and fibrous reinforcement for the body of resinous material composed of strands distributed through the body and being less than one inch long and each strand containing a multiplicity of glass fibers collected in compact side by side relation in textile strand form, the strands being haphazardly interrelated.

4. An insulated electrical conductor and a covering thereon, the covering being a continuous body of polyethylene extruded over the conductor and completely surrounding the conductor, and fibrous reinforcement for the body of polyethylene composed of strands of glass fibers distributed through the body and being approximately $\frac{1}{32}$ to $\frac{1}{4}$ inch long and each strand being composed of a multiplicity of glass fibers collected in compact side by side relation in textile strand form, the strands being haphazardly interrelated.

5. An insulated electrical conductor having a core of a plurality of wires therein lying side by side, glass fiber yarns disposed in the valleys between said wires at the surface of said core and extending lengthwise of the conductor and continuously through the length of the conductor to reinforce the tensile strength of the conductor, a covering for the core forming the outer sheath of the conductor and composed of a continuous body of polyethylene completely surrounding the core, and fibrous reinforcement for the body of polyethylene in the form of strands of glass fibers distributed through the body and being approximately one thirty-second to one-quarter inch long and each composed of a multiplicity of glass fibers collected in compact side by side relation in textile strand form, the strands being haphazardly interrelated.

6. An insulated electrical cable consisting of an aluminum conductor, a continuous body of extruded electrical insulation material over the conductor with glass fiber strands dispersed haphazardly throughout the insulation material, and glass fiber strands overlying the conductor parallel to the conductor and in engagement with the inside surface of the extruded insulation material.

References Cited in the file of this patent

UNITED STATES PATENTS

| Number | Name | Date |
| --- | --- | --- |
| 424,575 | Reed | Apr. 1, 1890 |
| 2,258,218 | Rochow | Oct. 7, 1941 |
| 2,294,919 | Lunsford | Sept. 8, 1942 |
| 2,325,549 | Ryzowitz | July 27, 1943 |
| 2,354,593 | Greider et al. | July 25, 1944 |
| 2,390,039 | Slayter et al. | Nov. 27, 1945 |
| 2,477,555 | Roberts et al. | July 26, 1949 |
| 2,498,785 | Bennett et al. | Feb. 28, 1950 |

FOREIGN PATENTS

| Number | Country | Date |
| --- | --- | --- |
| 597,473 | Great Britain | Jan. 27, 1948 |
| 618,094 | Great Britain | Feb. 16, 1949 |